US012613019B2

(12) United States Patent
Mochizuki

(10) Patent No.: US 12,613,019 B2
(45) Date of Patent: Apr. 28, 2026

(54) VEHICLE LAMP

(71) Applicant: Koito Manufacturing Co., Ltd., Tokyo (JP)

(72) Inventor: Kazuma Mochizuki, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 0 days.

(21) Appl. No.: 19/070,720

(22) Filed: Mar. 5, 2025

(65) Prior Publication Data

US 2025/0198582 A1 Jun. 19, 2025

Related U.S. Application Data

(63) Continuation of application No. PCT/JP2023/032175, filed on Sep. 4, 2023.

(30) Foreign Application Priority Data

Sep. 7, 2022 (JP) ................................ 2022-142220

(51) Int. Cl.

| | |
|---|---|
| ***F21S 41/19*** | (2018.01) |
| ***F21S 41/153*** | (2018.01) |
| ***F21S 41/25*** | (2018.01) |
| ***F21S 45/48*** | (2018.01) |
| ***F21V 23/00*** | (2015.01) |
| *F21Y 105/10* | (2016.01) |
| *F21Y 115/10* | (2016.01) |

(52) U.S. Cl.

CPC ........... *F21S 41/192* (2018.01); *F21S 41/153* (2018.01); *F21S 41/25* (2018.01); *F21S 45/48* (2018.01); *F21V 23/006* (2013.01); *F21Y 2105/10* (2016.08); *F21Y 2115/10* (2016.08)

(58) Field of Classification Search

CPC ........ F21S 41/192; F21S 41/25; F21S 41/153; F21S 45/48; F21V 23/006

See application file for complete search history.

(56) References Cited

U.S. PATENT DOCUMENTS

2018/0313516 A1* 11/2018 Warner ................ F21S 41/192
2019/0211986 A1* 7/2019 Tokida .................. H10H 20/80

(Continued)

FOREIGN PATENT DOCUMENTS

EP 2781826 A1 9/2014
EP 3489082 A1 5/2019

(Continued)

OTHER PUBLICATIONS

Extended European Search Report issued on May 22, 2025, in corresponding European Patent Application No. 23863129.5. (8 pages).

(Continued)

*Primary Examiner* — Christopher E Dunay
(74) *Attorney, Agent, or Firm* — BUCHANAN, INGERSOLL & ROONEY PC

(57) ABSTRACT

A vehicle lamp includes a light source mounting board mounted with a multi-segment LED array, a control circuit board mounted with a circuit for controlling light emission of the multi-segment LED array, and a projection lens that deflects light emitted from the multi-segment LED array. The light source mounting board and the control circuit board are disposed to be integrated together.

7 Claims, 5 Drawing Sheets

(56) References Cited

U.S. PATENT DOCUMENTS

| | | | | |
|---|---|---|---|---|
| 2021/0164640 | A1 | 6/2021 | Seong et al. | |
| 2022/0065424 | A1 * | 3/2022 | Han | F21S 45/47 |
| 2022/0243886 | A1 | 8/2022 | Yu | |
| 2023/0097767 | A1 * | 3/2023 | Sato | G02B 19/0066<br>362/539 |
| 2024/0410544 | A1 * | 12/2024 | Ikuta | F21S 41/365 |

FOREIGN PATENT DOCUMENTS

| | | | | |
|---|---|---|---|---|
| EP | 3517828 | A1 | 7/2019 | |
| JP | 2022-048556 | A | 3/2022 | |
| JP | 2022-070295 | A | 5/2022 | |
| KR | 20-2021-0002770 | U | 12/2021 | |
| KR | 20210002770 | U * | 12/2021 | H01R 13/2421 |
| WO | 2020/250758 | A1 | 12/2020 | |
| WO | 2021/157495 | A1 | 8/2021 | |

OTHER PUBLICATIONS

International Preliminary Report on Patentability (Form PCT/IB/373) and the Written Opinion of the International Searching Authority (Form PCT/ISA/237) issued on Mar. 1, 2025, by the International Bureau of WIPO in corresponding International Application No. PCT/JP2023/032175. (10 pages).

International Search Report (Form PCT/ISA/210) issued on Oct. 24, 2023, by the Japanese Patent Office in corresponding International Application No. PCT/JP2023/032175. (5 pages).

* cited by examiner

VEHICLE LAMP

BACKGROUND OF THE INVENTION

1. Field of the Invention

The present invention relates to vehicle lamps.

2. Description of the Related Art

Headlamps for automobiles in recent years have adopted adaptive driving beam (ADB) control that provides enhanced effectiveness in illuminating the region ahead of the automobiles while preventing leading vehicles, oncoming vehicles, or pedestrians from being dazzled by the headlamps.

Patent Literature 1 discloses a vehicle lamp that performs ADB control with the use of a multi-segment LED array that includes many microscopic LED light emitting elements arrayed in a matrix. Each individual microscopic LED light emitting element in the multi-segment LED array selectively emits light in accordance with a control signal from a lamp driving module, and light from the lit microscopic LED light emitting elements form a desired light distribution pattern.

[Patent Literature 1] JP2022-70295

SUMMARY OF THE INVENTION

In the vehicle lamp disclosed in Patent Literature 1, the lamp driving module and the multi-segment LED array are electrically connected by a cord. A control signal from the lamp driving module is sent to the multi-segment LED array through the cord. Such a configuration lengthens the communication line between the lamp driving module and the multi-segment LED array by the length of the cord, which thus increases the likelihood of an error in the communication between the lamp driving module and the multi-segment LED array. This communication error may result in failure to form a desired light distribution pattern.

The present invention has been made in view of such circumstances and is directed to providing a vehicle lamp that can form a desired light distribution pattern with high reliability.

To address the problem above, a vehicle lamp according to one aspect of the present invention includes a light source mounting board mounted with a light source, a control circuit board mounted with a circuit for controlling light emission of the light source, and an optical component that deflects light emitted from the light source. The light source mounting board and the control circuit board are disposed to be integrated together.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
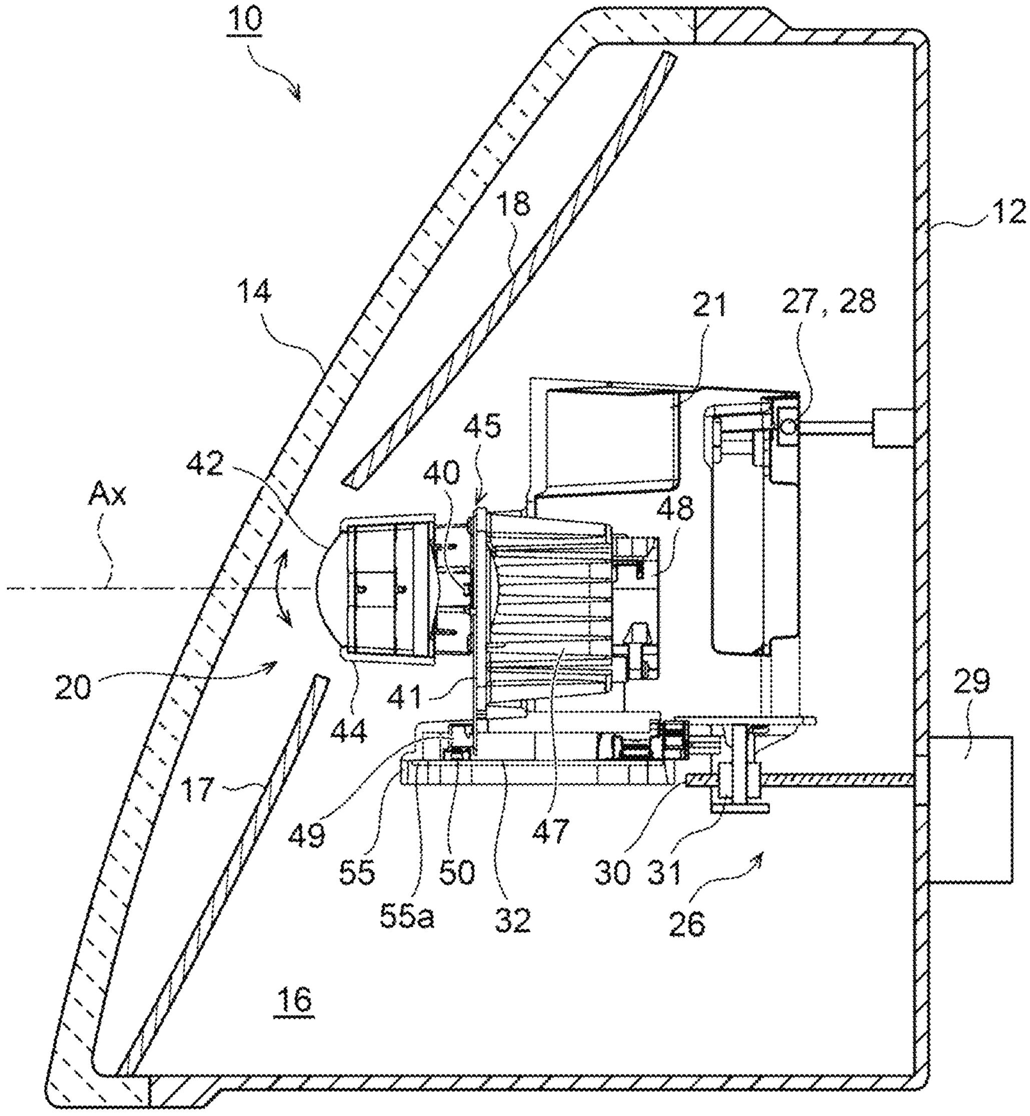
FIG. 1 is a schematic longitudinal sectional view of a vehicle lamp according to an embodiment of the present invention.

Hereinafter, some embodiments for implementing the present invention will be described in detail with reference to the drawings. In the description of the drawings, identical elements are given identical reference characters, and duplicate description thereof will be omitted as appropriate. When terms indicating directions, such as "above," "below," "front," "back/rear," "left," "right," "inner," and "outer," are used in the present specification, these terms indicate directions relative to the posture held when the vehicle lamp is mounted to a vehicle.

FIG. 1 is a schematic longitudinal sectional view of a vehicle lamp 10 according to an embodiment of the present invention. The vehicle lamp 10 shown in FIG. 1 is disposed at each of the front right and left ends of a vehicle body and functions as a headlamp.

As shown in FIG. 1, the vehicle lamp 10 includes a lamp body 12 with an open front and a front cover 14 attached to the open front part of the lamp body 12. The lamp body 12 and the front cover 14 form a lamp housing, and a lamp room 16 is formed within the lamp housing.

A plurality of lamp units are disposed in the lamp room 16. The plurality of lamp units include, for example, a headlamp unit, a turn signal lamp unit, and a clearance lamp unit. The vehicle lamp 10 is configured as a complex headlamp with these lamp units provided in a single lamp housing. The present specification mainly describes a headlamp unit capable of ADB control.

FIG. 1 shows a headlamp unit 20. The headlamp unit 20 is attached to the lamp body 12 in a state in which the direction of an illumination optical axis Ax is adjustable as appropriate. Inside the lamp room 16, the headlamp unit 20 is supported by a leveling bracket 21.

The leveling bracket 21 is supported to the lamp body 12 by a leveling mechanism 26 that is tiltable in the up-down direction. In this leveling mechanism 26, fulcrum parts 27 and 28 support the leveling bracket 21 to the lamp body 12 at the upper edge of the leveling bracket 21, or, in this example, at two positions on the right and left along the upper edge of the leveling bracket 21. Meanwhile, the leveling bracket 21 is coupled at a part of its lower edge to a leveling actuator 29 supported to the lamp body 12. This leveling actuator 29 includes a leveling screw 30. The leveling screw 30 is threaded in a leveling nut 31 attached to a part of the lower edge of the leveling bracket 21. The leveling nut 31 threaded on the leveling screw 30 advances along the thread when the leveling actuator 29 is rotationally driven, and along with this advancement, the lower edge of the leveling bracket 21 moves in the front-back direction to control the change in its forward tilt angle.

Extension reflectors 17 and 18 are provided in 15 the lamp room 16. The extension reflectors 17 and 18 are disposed below and above the projection lens of the lamp unit. The extension reflectors 17 and 18 work to improve the appearance by covering structural components and so on within the lamp room 16.

The leveling bracket 21 supports the headlamp unit 20 and a control circuit board 32 that is mounted with a circuit for controlling light emission of the light source in the headlamp unit 20.

Figure 2:
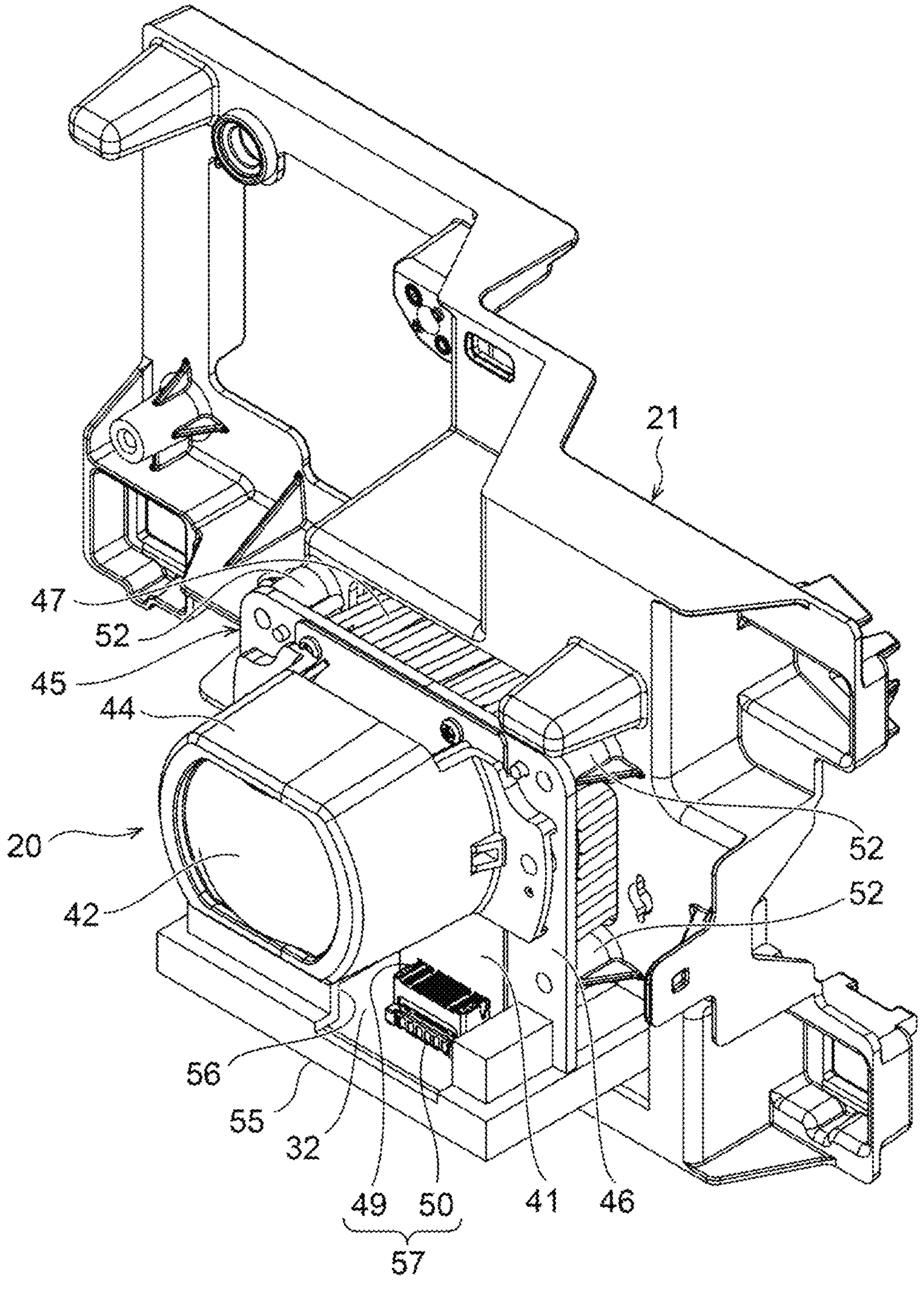
FIG. 2 is a perspective view showing a state in which a headlamp unit and a control circuit board are placed in a leveling bracket.
Figure 3:
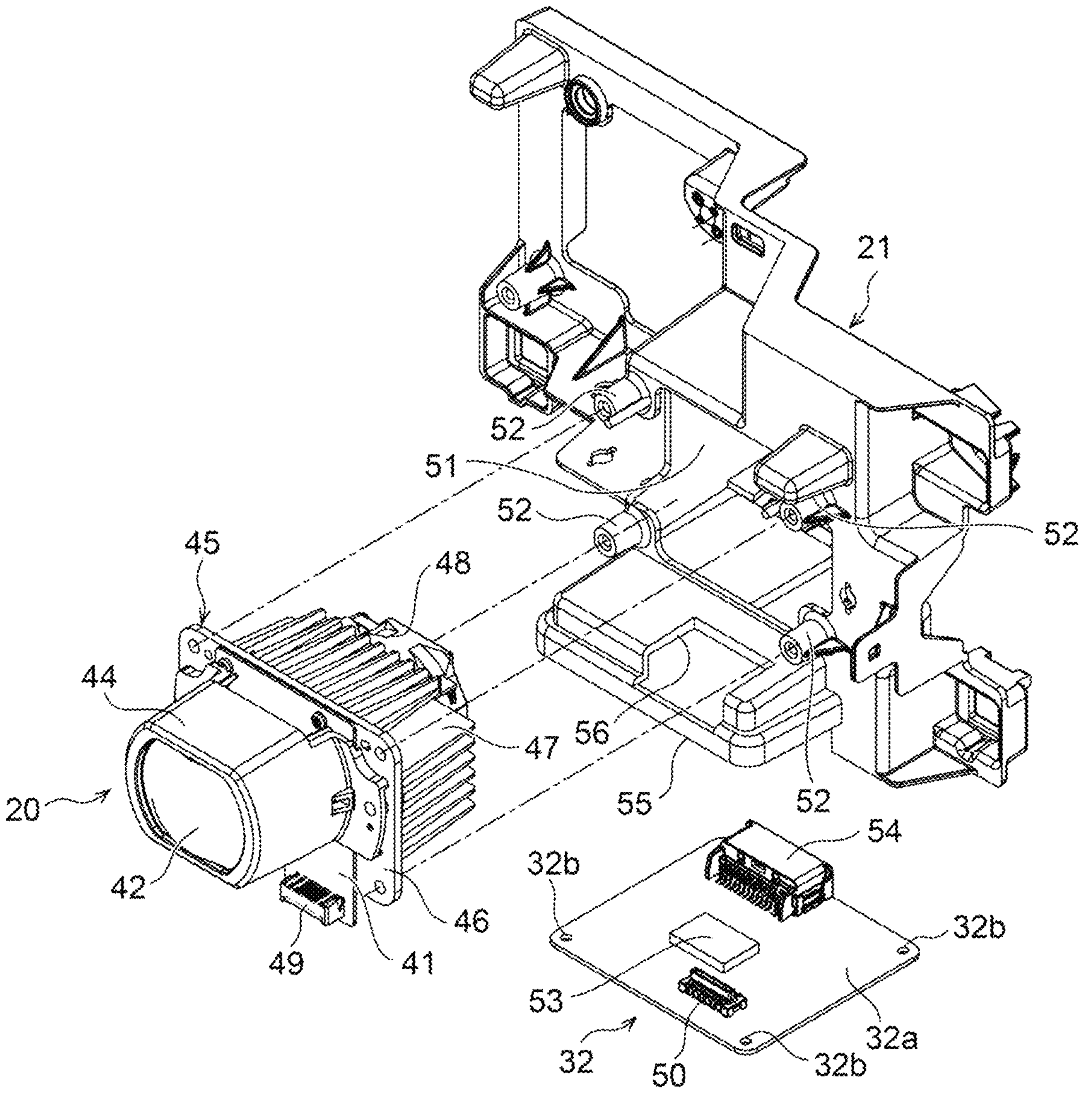
FIG. 3 is a perspective view showing a state in which a headlamp unit and a control circuit board are separated from a leveling bracket.

FIG. 2 is a perspective view showing a state in which the headlamp unit 20 and the control circuit board 32 are placed in the leveling bracket 21. FIG. 3 is a perspective view showing a state in which the headlamp unit 20 and the control circuit board 32 are separated from the leveling bracket 21.

Figure 4:
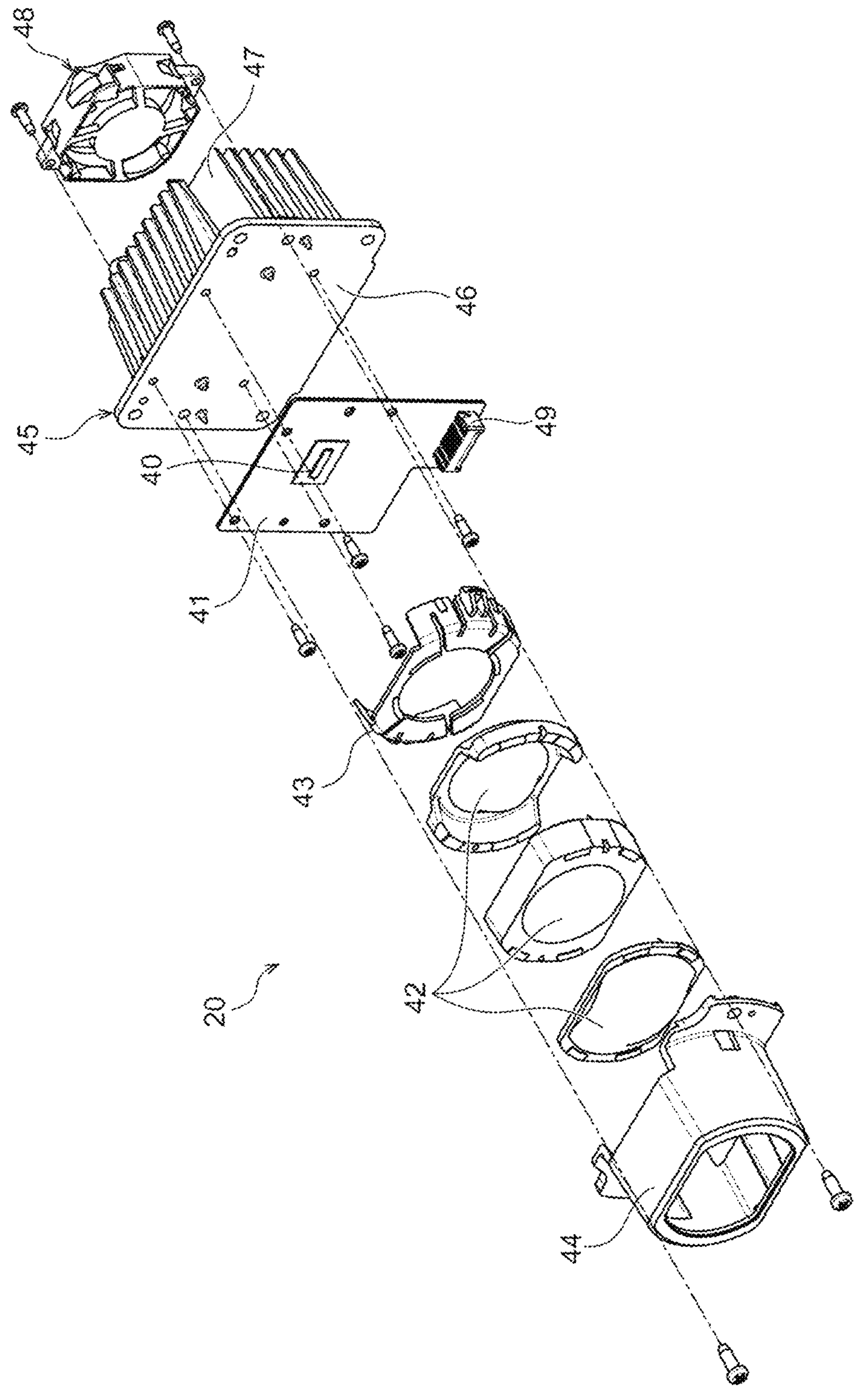
FIG. 4 is an exploded perspective view of a headlamp unit.

Now, a configuration of the headlamp unit 20 will be described in detail. FIG. 4 is an exploded perspective view of the headlamp unit 20.

The headlamp unit 20 is a so-called direct-illumination-type lamp unit. The headlamp unit 20 includes a multi-segment LED array 40 serving as a light source, a light source mounting board 41, a projection lens 42 serving as an optical component that deflects light from the multi-segment LED array 40, a front-side lens holder 44, and a rear-side lens holder 43.

According to the present embodiment, the projection lens 42 includes three projection lenses. The three projection lenses are fastened to each other as they are pressed against the back side of the front-side lens holder 44 by the rear-side lens holder 43. The three projection lenses are positioned to each other by their respective positioning portions facing outward from their respective optical surfaces. The rear-side lens holder 43 urges the rearmost projection lens forward with the rear-side lens holder 43 holding the outer side of the optical surface of the rearmost projection lens. The rear-side lens holder 43 is fastened to the front-side lens holder 44 by, for example, a snap structure.

The head lamp unit 20 further includes a heat sink 45 for dissipating heat produced from the multi-segment LED array 40. The heat sink 45 is formed of metal having high heat conductivity, such as aluminum, and includes a planar base portion 46 and heat-dissipating fins 47 erected with predetermined intervals on the back surface of the base portion 46. The heat-dissipating fins 47 may each be, for example, planar or columnar in shape.

The headlamp unit 20 further includes a fan 48. The fan 48 is disposed behind the heat-dissipating fins 47 of the heat sink 45. The fan 48 sends the air inside the lamp room 16 toward the heat-dissipating fins 47 to forcibly cool the heat-dissipating fins 47.

The multi-segment LED array 40 is mounted on a first principal surface (front surface) of the light source mounting board 41. The multi-segment LED array 40 is configured of many microscopic LED light emitting elements (referred to below as pixel elements) arrayed in a matrix. Each individual pixel element in the multi-segment LED array 40 selectively emits light in accordance with control by the control circuit mounted on the control circuit board 32, and light from the lit pixel elements form a necessary light emission pattern. As this light emission pattern is projected by the projection lens 42, an ADB light distribution pattern or the like is formed in which many illumination regions corresponding to the pixel elements are combined.

The light source mounting board 41 is mounted on the heat sink 45 such that a second principal surface (back surface) of the light source mounting board 41 abuts the base portion 46 of the heat sink 45. In the state of being mounted on the heat sink 45, the principal surfaces (front and back surfaces) of the light source mounting board 41 are perpendicular to the optical axis Ax of the headlamp unit 20.

In order to transfer heat produced in the multi-segment LED array 40 effectively to the heat sink 45, the light source mounting board 41 may be formed of metal having high heat conductivity, such as copper or aluminum. The light source mounting board 41 has a circuit pattern (not shown) formed thereon to supply power to the multi-segment LED array 40. Methods of forming an insulating film on a metal substrate and then forming a circuit pattern thereon are conventionally known, and, for example, the method described in International Patent Publication No. WO2015/050164 can be used.

A receptacle connector 49 is mounted on the lower end of the light source mounting board 41. The receptacle connector 49 is connected to the multi-segment LED array 40 via the circuit pattern formed on the light source mounting board 41. The receptacle connector 49 forms a pair with a plug connector 50 mounted on the control circuit board 32, and they together form a board-to-board connector (B-to-B connector) 57.

The headlamp unit 20 configured as described above is placed in the leveling bracket 21. As shown in FIG. 3, the leveling bracket 21 has a rectangular, heat-dissipating-fin inserting opening 51 formed therein to receive the heat-dissipating fins 47 of the headlamp unit 20. Four heat sink supporters 52 are formed by the respective corners of the heat-dissipating-fin inserting opening 51 to support the heat sink 45 of the headlamp unit 20.

Figure 5:
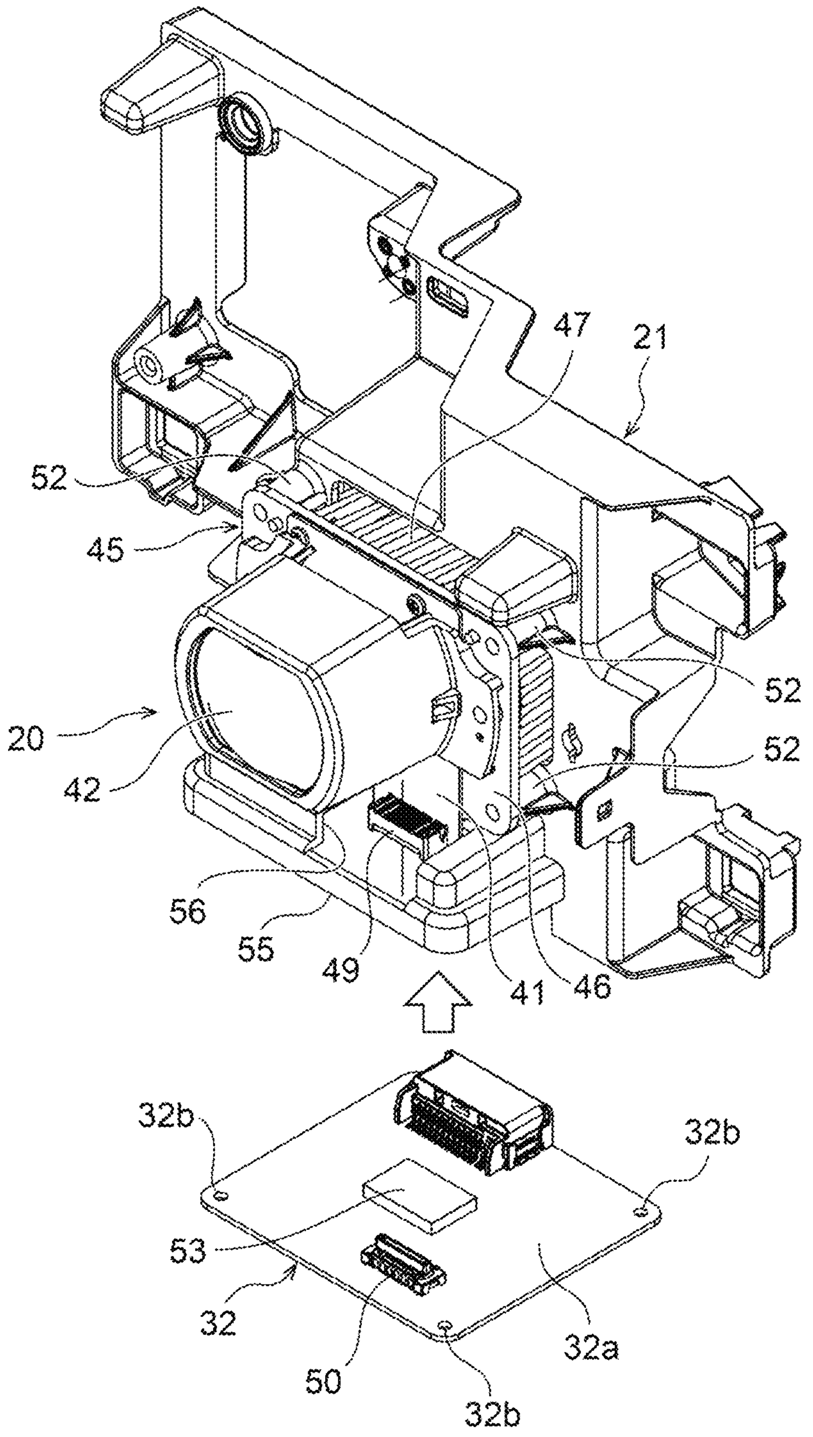
FIG. 5 is a perspective view showing a state in which a headlamp unit is assembled to a leveling bracket.

When the headlamp unit 20 is assembled to the leveling bracket 21, first, while the heat-dissipating fins 47 of the heat sink 45 are inserted into the heat-dissipating-fin inserting opening 51 of the leveling bracket 21, the base portion 46 of the heat sink 45 is placed onto the four heat sink supporters 52. A through-hole is formed in each of the four corners of the rectangular base portion 46. Meanwhile, a bolt hole is formed in each of the heat sink supporters 52. The through-holes in the base portion 46 and the bolt holes in the heat sink supporters 52 are positioned to each other, and bolts (not shown) are inserted in the through-holes and threaded into the bolt holes. Thus, the headlamp unit 20 is fastened to the leveling bracket 21. FIG. 5 is a perspective view showing a state in which the headlamp unit 20 is assembled to the leveling bracket 21.

A light emission control circuit 53 for controlling light emission of the multi-segment LED array 40 in the headlamp unit 20 is mounted on the control circuit board 32. The control circuit board 32 may be a glass-epoxy board. At the rear end of the control circuit board 32, an ECU connector 54 is provided to connect an electronic control unit (ECU) of the vehicle provided with the vehicle lamp 10 to the light emission control circuit 53.

The light emission control circuit 53, based on a lamp control signal from the vehicle's ECU, controls light emission of the multi-segment LED array 40 to control pattern formation of an ADB light distribution pattern, that is, selectively causes the pixel elements of the multi-segment LED array 40 to emit light.

The plug connector 50 is mounted at the front end of the control circuit board 32. The plug connector 50 is connected to the light emission control circuit 53 via a circuit pattern formed on the control circuit board 32.

The control circuit board 32 is placed in the leveling bracket 21. As shown in FIG. 3, a control circuit board supporter 55 is provided at the lower portion of the leveling bracket 21. This control circuit board supporter 55 is provided below the heat-dissipating-fin inserting opening 51 and the heat sink supporters 52. The control circuit board supporter 55 is configured as a rectangular, bottomed frame member that can house the control circuit board 32. The control circuit board supporter 55 includes an abutment portion 55*a* (see FIG. 1) along the inner periphery of the frame member that is configured to abut the peripheral portion of an upper surface 32*a* of the control circuit board 32, and four bolt holes are formed in the respective corners of the abutment portion.

A connector inserting opening 56 is formed in a part of the bottom of the control circuit board supporter 55 of the leveling bracket 21. In the state in which the headlamp unit 20 is assembled to the leveling bracket 21, the receptacle connector 49 provided at the lower end of the light source mounting board 41 is exposed to below the leveling bracket 21 through the connector inserting opening 56.

When the control circuit board 32 is assembled to the leveling bracket 21, the leveling bracket 21 is assembled to the headlamp unit 20 as shown in FIG. 5, the control circuit board 32 is housed into the frame member from below the control circuit board supporter 55, and then the peripheral portion of the upper surface 32*a* of the control circuit board 32 is made to abut the abutment portion. At this point, the plug connector 50 of the control circuit board 32 is fitted with the receptacle connector 49 of the light source mounting board 41 exposed through the connector inserting opening 56. Thus, the control circuit board 32 and the light source mounting board 41 become integrated via the board-to-board connector 57, and the control circuit board 32 and the light source mounting board 41 become electrically connected to each other via the board-to-board connector 57. Then, the bolt holes formed in the abutment portion and the through-holes 32*b* formed in the four corners of the control circuit board 32 are positioned to each other, bolts (not shown) are inserted into the through-holes 32*b* and threaded into the bolt holes, and thus the control circuit board 32 becomes fastened to the leveling bracket 21 with the receptacle connector 49 and the plug connector 50 being connected to each other. In the state in which the control circuit board 32 is assembled to the leveling bracket 21, the control circuit board 32 is disposed perpendicular to the light source mounting board 41. Herein, the control circuit board 32 being perpendicular to the light source mounting board 41 encompasses not only the case of being precisely perpendicular but also the case of substantially perpendicular. In other words, it encompasses not only the case in which the angle formed by the control circuit board 32 and the light source mounting board 41 is precisely 90 degrees but also the case in which the angle formed by the two is off from 90 degrees by several degrees (e.g., 5 degrees or so).

In the vehicle lamp 10 according to the present embodiment, when the headlamp unit 20 and the control circuit board 32 are assembled to the leveling bracket 21 as shown in FIG. 2, the light source mounting board 41 and the control circuit board 32 are integrated via the board-to-board connector 57 formed by the receptacle connector 49 and the plug connector 50. When the light source mounting board 41 and the control circuit board 32 are integrated in this manner, the communication line between the multi-segment LED array 40 and the light emission control circuit 53 can be shortened, as compared to the case of using a cord as in Patent Literature 1 described above. Shortening the communication line can prevent noise from entering the communication line or reduce signal attenuation and can thus reduce the likelihood of communication errors. Furthermore, the fact that no cord is used can help prevent an occurrence of a communication error caused by moving or bending of a cord. Therefore, the vehicle lamp 10 according to the present embodiment can provide a vehicle lamp that can form a desired light distribution pattern with high reliability.

In the vehicle lamp 10 according to the present embodiment, a board-to-board connector is used to integrate the light source mounting board 41 and the control circuit board 32. The use of the board-to-board connector can improve the reliability of communication between the multi-segment LED array 40 and the light emission control circuit 53.

In the vehicle lamp 10 according to the present embodiment, integrating the light source mounting board 41 and the control circuit board 32 with the control circuit board 32 disposed perpendicular to the light source mounting board 41 renders unnecessary the space for excess cord length processing, and thus the device configuration, in particular, the device size in the up-down direction and the depth direction can be reduced. The use of the board-to-board connector makes it possible to easily dispose the light source mounting board 41 and the control circuit board 32 perpendicular to each other.

In the vehicle lamp 10 according to the present embodiment, the light source mounting board 41 and the control circuit board 32 are both supported by the leveling bracket 21. With this configuration, the positional relationship between the light source mounting board 41 and the control circuit board 32 remains unchanged even when the headlamp unit 20 is tilted in the up-down direction or in the right-left direction, and thus the reliability of communication between the multi-segment LED array 40 and the light emission control circuit 53 can be improved.

Thus far, the present invention has been described based on embodiments. These embodiments are merely illustrative, and it should be appreciated by a person skilled in the art that various modifications can be made to the combinations of the constituent elements and processing processes and that such modifications also fall within the scope of the present invention.

For example, in the foregoing embodiments, a multi-segment LED array serves as an example of the light source, but the light source is not limited thereto, and a semiconductor laser, for example, can also be used.

In the foregoing embodiments, the receptacle connector is provided on the light source mounting board, and the plug connector is provided on the control circuit board. Conversely, the plug connector may be provided on the light source mounting board, and the receptacle connector may be provided on the control circuit board.

In the foregoing embodiments, the light source mounting board and the control circuit board are integrated via the board-to-board connector, but the method of integrating the light source mounting board and the control circuit board is not limited thereto, various other methods can be employed.

The embodiments can also be expressed as in the numbered clauses below.

1. A vehicle lamp, comprising:
   - a light source mounting board mounted with a light source;
   - a control circuit board mounted with a circuit for controlling light emission of the light source; and
   - an optical component that deflects light emitted from the light source, wherein
   - the light source mounting board and the control circuit board are disposed to be integrated together.
2. The vehicle lamp according to clause 1, wherein
   - the light source mounting board and the control circuit board are integrated via a board-to-board connector.
3. The vehicle lamp according to clause 1 or 2, wherein
   - the light source mounting board is disposed perpendicular to the control circuit board.
4. The vehicle lamp according to any one of clauses 1 to 3, further comprising:
   - a bracket that supports both the light source mounting board and the control circuit board.

5. The vehicle lamp according to clause 4, further comprising:
a heat sink for dissipating heat produced from the light source, wherein
the light source mounting board is supported to the bracket with the heat sink therebetween.
6. The vehicle lamp according to clause 5, wherein
the bracket includes
a heat sink supporter that supports the heat sink, and
a control circuit board supporter that is provided below the heat sink supporter and supports the control circuit board, and
the control circuit board is attached to the control circuit board supporter with the control circuit board abutting from below the control circuit board supporter.
7. The vehicle lamp according to clause 2, wherein
the board-to-board connector includes
a receptacle connector provided on one of the light source mounting board and the control circuit board, and
a plug connector provided on the other of the light source mounting board and the control circuit board.
8. The vehicle lamp according to any one of clauses 1 to 7, wherein
the light source is a multi-segment LED array that includes many microscopic LED light emitting elements arrayed in a matrix.
9. The vehicle lamp according to any one of clauses 1 to 8, wherein
the light source mounting board is a board formed of metal having high heat conductivity, and
the control circuit board is a glass-epoxy board.
What is claimed is:
1. A vehicle lamp, comprising:
a light source mounting board mounted with a light source;
a control circuit board mounted with a circuit for controlling light emission of the light source;
an optical component that deflects light emitted from the light source; and
a board-to-board connector including a receptacle connector provided on one of the light source mounting board and the control circuit board, and a plug connector provided on the other of the light source mounting board and the control circuit board, wherein
the light source mounting board and the control circuit board are integrated together via the board-to-board connector.
2. The vehicle lamp according to claim 1, wherein
the light source mounting board is disposed perpendicular to the control circuit board.
3. The vehicle lamp according to claim 1, further comprising:
a bracket that supports both the light source mounting board and the control circuit board.
4. The vehicle lamp according to claim 3, further comprising:
a heat sink for dissipating heat produced from the light source, wherein
the light source mounting board is supported to the bracket with the heat sink therebetween.
5. The vehicle lamp according to claim 4, wherein
the bracket includes
a heat sink supporter that supports the heat sink, and
a control circuit board supporter that is provided below the heat sink supporter and supports the control circuit board, and
the control circuit board is attached to the control circuit board supporter with the control circuit board abutting from below the control circuit board supporter.
6. The vehicle lamp according to claim 1, wherein
the light source is a multi-segment LED array that includes many microscopic LED light emitting elements arrayed in a matrix.
7. The vehicle lamp according to claim 1, wherein
the light source mounting board is a board formed of metal having high heat conductivity, and
the control circuit board is a glass-epoxy board.

* * * * *